US012762988B2

(12) United States Patent
Chen et al.

(10) Patent No.: US 12,762,988 B2
(45) Date of Patent: Oct. 13, 2026

(54) SOURCE DRIVER IC, MODE CONTROL METHOD AND DISPLAY DEVICE

(71) Applicant: TCL CHINA STAR OPTOELECTRONICS TECHNOLOGY CO., LTD., Shenzhen (CN)

(72) Inventors: Weifeng Chen, Shenzhen (CN); Kaiyu Liu, Shenzhen (CN); Qianqian Lv, Shenzhen (CN); Xianli Shang, Shenzhen (CN); Haiqi Mo, Shenzhen (CN); Fan Chen, Shenzhen (CN); Xiaoying Guo, Shenzhen (CN); Jianjiao Wang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/186,611

(22) Filed: Apr. 22, 2025

(65) Prior Publication Data

US 2026/0188172 A1 Jul. 2, 2026

(30) Foreign Application Priority Data

Dec. 31, 2024 (CN) ........................ 202411998717.X

(51) Int. Cl.
*G09G 3/32* (2016.01)
*G09G 3/20* (2006.01)
(Continued)

(52) U.S. Cl.
CPC ... *G09G 3/2092* (2013.01); *G09G 2300/0814* (2013.01); *G09G 2310/0275* (2013.01); *G09G 2310/08* (2013.01); *G09G 2330/021* (2013.01)

(58) Field of Classification Search
CPC ......... G09G 3/2092; G09G 2300/0814; G09G 2310/0275; G09G 2310/08; G09G 2330/021
See application file for complete search history.

(56) References Cited

U.S. PATENT DOCUMENTS

| | | | | |
|---|---|---|---|---|
| 2010/0231787 A1* | 9/2010 | Kim | ..................... | G09G 3/3688 348/503 |
| 2011/0148845 A1* | 6/2011 | Uehara | ................ | G09G 3/3692 345/212 |

(Continued)

FOREIGN PATENT DOCUMENTS

| | | |
|---|---|---|
| CN | 103106861 A | 5/2013 |
| CN | 104538000 A | 4/2015 |

(Continued)

OTHER PUBLICATIONS

Chinese Office Action issued in corresponding Chinese Patent Application No. 202411998717.X dated Sep. 28, 2025, pp. 1-7.

*Primary Examiner* — Md Saiful A Siddiqui
(74) *Attorney, Agent, or Firm* — PV IP PC; Peter Stecher; Wei Te Chung

(57) ABSTRACT

The present disclosure provides a source driver IC, a mode control method and a display device. The source driver IC is connected to a timing controller, and the source driver IC includes a state detection module, a logic control module and a first mode control module. The state detection module is configured to detect whether a lock signal output by the source driver IC to the timing controller is switched from a first level to a second level. The logic control module is configured to control the first mode control module to enable a first recognition mode to perform a first correctness check on a driving information of one or more image frames when the lock signal is switched from the first level to the second
(Continued)

level; and control the first mode control module to disable the first recognition mode after a target condition is satisfied.

14 Claims, 5 Drawing Sheets

(51) Int. Cl.
*H04L 7/033* (2006.01)
*H04L 7/04* (2006.01)

(56) References Cited

U.S. PATENT DOCUMENTS

| | | | | |
|---|---|---|---|---|
| 2012/0169708 | A1* | 7/2012 | Wu | G09G 3/2096 345/214 |
| 2015/0187315 | A1* | 7/2015 | Park | G09G 3/3685 345/99 |
| 2020/0126508 | A1* | 4/2020 | Kim | G06F 1/08 |
| 2022/0011895 | A1* | 1/2022 | Park | G06F 3/04166 |
| 2022/0180814 | A1* | 6/2022 | Jung | G09G 3/3275 |
| 2023/0386388 | A1* | 11/2023 | Nam | G09G 3/20 |

FOREIGN PATENT DOCUMENTS

| | | | |
|---|---|---|---|
| CN | 104538001 | A | 4/2015 |
| CN | 113380191 | A | 9/2021 |
| CN | 117690366 | A | 3/2024 |
| KR | 102577291 | B1 | 9/2023 |

* cited by examiner

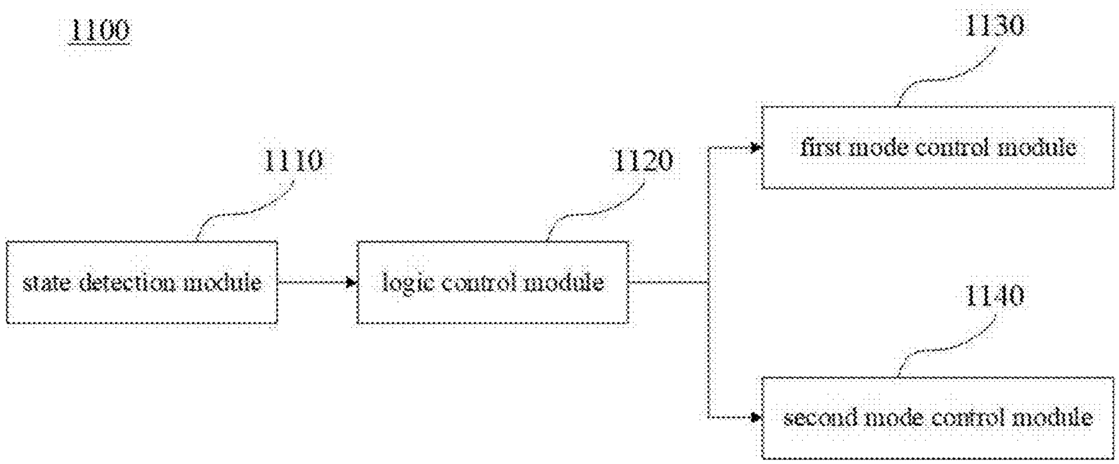

FIG. 1

| | | | | | |
|---|---|---|---|---|---|
| a first line of data | CT | CS | CMD1 | image data | CE |
| a second line of data | CT | CS | CMD2 | image data | CE |
| | CT | CS | CMD1 | image data | CE |
| | CT | CS | CMD2 | image data | CE |
| ⋮ | CT | CS | CMD1 | image data | CE |
| | CT | CS | CMD2 | image data | CE |
| | CT | CS | CMD1 | image data | CE |
| a last line of data | CT | CS | CMD2 | image data | CE |
| frame setting | CT | CS | CMD3 | Frame CTL setting | CE |
| vertical blanking | CT | CS | CMD4 | CT | |
| | CT | CS | CMD5 | CT | |

FIG. 2

| instruction | meaning |
|---|---|
| CT | Clock calibration command |
| CS | Data start command |
| CE | Data end command |
| CMD1 | Indicate that display data in a display area is positive polarity |
| CMD2 | Indicate that the display data in the display area is negative polarity |
| CMD3 | Indicate a start of a source driver IC function register |
| CMD4 | Indicate that a vertical blanking area is positive polarity |
| CMD5 | Indicate that the vertical blanking area is negative polarity |

FIG. 3

SOURCE DRIVER IC, MODE CONTROL METHOD AND DISPLAY DEVICE

CROSS-REFERENCE TO RELATED APPLICATION

The application claims priority to and the benefit of Chinese Patent Application No. 202411998717.X, filed on Dec. 31, 2024, the disclosure of which is incorporated herein by reference in its entirety.

TECHNICAL FIELD

The present disclosure relates to display technologies, and in particular, to a source driver IC, a mode control method and a display device.

BACKGROUND

With the development of the display technologies, users have higher and higher requirements for energy consumption of the display device. Reducing the energy consumption of the display device is conducive to improving product competitiveness, promoting environmental protection, prolonging service life, enhancing power efficiency, etc., and thus a display device with low power consumption has become an important development direction of the display technologies. How to reduce the energy consumption of the display device is a subject that the industry has been committed to researching.

SUMMARY

Embodiments of the present disclosure provide a source driver IC, a mode control method and a display device. The dynamic power consumption of the source driver IC can be reduced through a working state control of a first recognition mode, and thus the energy consumption of the display device can be reduced.

An embodiment of the present disclosure provides a source driver IC, connected to a timing controller. The source driver IC includes a state detection module, a logic control module and a first mode control module.

The state detection module is configured to detect whether a lock signal output by the source driver IC to the timing controller is switched from a first level to a second level.

The logic control module is configured to:

- control the first mode control module to enable a first recognition mode to perform a first correctness check on a driving information of one or more image frames when the lock signal is switched from the first level to the second level; and
- control the first mode control module to disable the first recognition mode after a target condition is satisfied.

Correspondingly, an embodiment of the present disclosure provides a mode control method, applied to a source driver IC of a display device, and the source driver IC being connected to a timing controller of the display device. The mode control method includes:

- enabling a first recognition mode to perform a first correctness check on a driving information of one or more image frames when a lock signal output by the source driver IC to the timing controller is switched from a first level to a second level; and
- disabling the first recognition mode after a target condition is satisfied.

Correspondingly, an embodiment of the present disclosure provides a display device. The display device includes the aforementioned source diver IC.

BRIEF DESCRIPTION OF THE DRAWINGS

FIG. 1 is a schematic diagram of a source driver IC according to an embodiment of the present disclosure;

FIG. 2 is a schematic diagram of at least part of content included in an image frame according to an embodiment of the present disclosure;

FIG. 3 is a schematic diagram of meanings of instructions according to an embodiment of the present disclosure;

DETAILED DESCRIPTION

Figure 4:
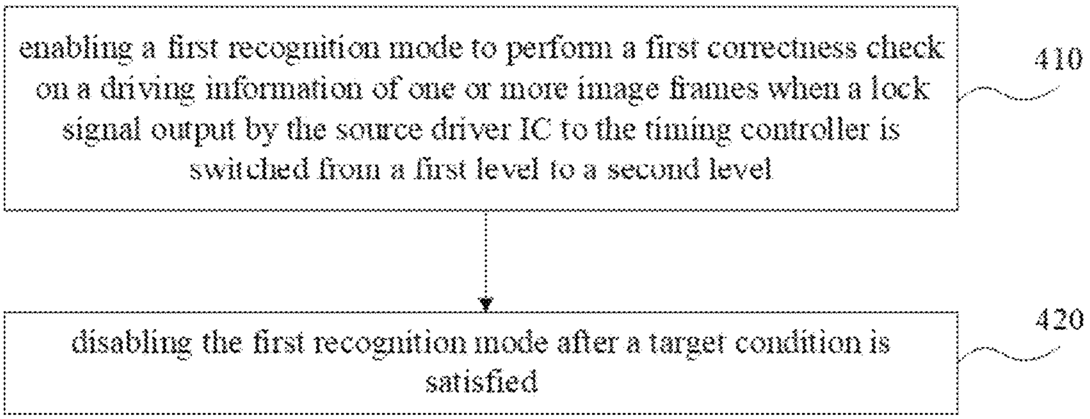
FIG. 4 is a flowchart of a mode control method according to an embodiment of the present disclosure.

Technical solutions in the embodiments of the present disclosure will be described below in conjunction with drawings in the embodiments of the present disclosure. The described technical solutions are merely for explaining and illustrating the ideas of the present disclosure, and should not be construed as limiting the scope of protection of the present disclosure.

In addition, “plurality of” in the embodiments of the present disclosure refers to two or more. “First”, “second” and the like in the embodiments of the present disclosure are used to distinguish different technical features, and do not indicate any order, quantity, or importance.

The various embodiments provided in the present disclosure are similar, and features in different embodiments may be combined with each other.

The order of description of the following embodiments is not intended to limit the preferred order of the embodiments.

Referring to FIG. 1, FIG. 1 is a schematic diagram of a source driver IC according to an embodiment of the present disclosure. The source driver IC may be connected to a timing controller (TCON) of a display device, and please refer to the following embodiments. The source driver IC is also referred to as a source integrated circuit (Source IC) or a Driver IC. As shown in FIG. 1, the source driver IC 1100 includes a state detection module 1110, a logic control module 1120, and a first mode control module 1130.

The state detection module 1110 is configured to detect whether a lock signal output by the source driver IC 1100 to the timing controller is switched from a first level to a second level.

The logic control module 1120 is configured to: control the first mode control module 1130 to enable a first recognition mode to perform a first correctness check on a driving information of one or more image frames when the lock signal is switched from the first level to the second level; and control the first mode control module 1130 to disable the first recognition mode after a target condition is satisfied.

In the embodiments of the present disclosure, the source driver IC 1100 may output the lock signal to the timing controller, to indicate the timing controller whether the source driver IC 1100 successfully locks a clock signal from the timing controller. The lock signal being at the first level indicates that the source driver IC 1100 has not locked or has not successfully locked the clock signal. The lock signal being at the second level indicates that the source driver IC 1100 has successfully locked the clock signal, and the display device can work normally. The first level is different from the second level, and optionally, the first level is less than the second level. For example, the first level is a low level, and the second level is a high level. In the embodiments of the present disclosure, a possibility that the first level is greater than the second level is not excluded. For example, the first level is a high level, and the second level is a low level. Generally, after the display device is powered on or restored to normal after the images is abnormal, the lock signal may be switched from the first level to the second level.

The state detection module 1110 in the source driver IC 1100 may continuously detect the level state of the lock signal. In some embodiments, after the source driver IC 1100 is powered on, the state detection module 1110 starts to detect the level state of the lock signal. That is, the state detection module 1110 is configured to continuously perform a state detection on the lock signal after the source driver IC is powered on. The state detection includes detecting whether the lock signal is switched from the first level to the second level and detecting whether the lock signal is switched from the second level to the first level. Optionally, the state detection module 1110 is configured to: after the source driver IC 1100 is powered on, detect whether the lock signal is switched from the first level to the second level; after the lock signal is switched from the first level to the second level, detect whether the lock signal is switched from the second level to the first level; after the lock signal is switched from the second level to the first level, detect whether the lock signal is switched from the first level to the second level; and so on. In the embodiments of the present disclosure, the state detection module 1110 may continuously detect the level state switching of the lock signal. When the lock signal is at the first level, detect whether the lock signal is switched from the first level to the second level; and when the lock signal is at the second level, detect whether the lock signal is switched from the second level to the first level.

When the state detection module 1110 detects that the lock signal is switched from the first level to the second level, the logic control module 1120 in the source driver IC 1100 controls the first mode control module 1130 to enable the first recognition mode. The first recognition mode includes performing the first correctness check on the driving information of the image frame. In some embodiments, the driving information includes at least one of a data start instruction and a polarity indication instruction. The data start instruction is configured to indicate a start display moment of the image frame. The polarity indication instruction is configured to indicate a driving polarity of the image frame, and the driving polarity includes a positive polarity and a negative polarity. For example, FIG. 2 is a schematic diagram of at least part of content included in an image frame according to an embodiment of the present disclosure, and meanings of instructions in the image frame are shown in FIG. 3. The driving information of the image frame may include the CS instruction and the CMD instruction shown in FIG. 2 and FIG. 3. The CS instruction includes the aforementioned data start instruction, and the CMD instruction includes the aforementioned polarity indication instruction. Of course, the driving information of the image frame may also include other instructions, such as the CE instruction shown in FIG. 2 and FIG. 3, which is not limited in the embodiments of the present disclosure.

In some embodiments, the aforementioned logic control module 1120 is further configured to control the first mode control module 1130 to enable the first recognition mode for a first image frame when the lock signal is switched from the first level to the second level, so as to perform the first correctness check on the driving information of the first image frame. In some embodiments, the aforementioned logic control module 1120 is further configured to control the first mode control module 1130 to enable the first recognition mode for a first line of data in the first image frame when the lock signal is switched from the first level to the second level, so as to perform the first correctness check on the first line of the data in the first image frame. The first image frame refers to an initial image frame output by the source driver IC 1100 after the lock signal is switched from the first level to the second level.

Of course, in practical applications, if the source driver IC 1100 detects that the lock signal is switched from the first level to the second level, the first recognition mode may also be enabled for any one or more lines of the data in the initial image frame output by the source driver IC 1100 after the lock signal is switched from the first level to the second level. For example, the first recognition mode is enabled for a second line of the data in the initial image frame, or the first recognition mode is enabled for the first line of the data to the tenth line of the data in the initial image frame, which is not limited in the embodiments of the present disclosure. In addition, in practical applications, if the source driver IC 1100 detects that the lock signal is switched from the first level to the second level, the first recognition mode may also be enabled for any one or more image frames output by the source driver IC 1100 after the lock signal is switched from the first level to the second level. For example, the first recognition mode is enabled for a second image frame, or the first recognition mode is enabled for the first image frame to a third image frame. This is not limited in the embodiments of the present disclosure.

After the source driver IC 1100 enables the first recognition mode, the source driver IC 1100 continuously detects whether the target condition is satisfied. After the target condition is satisfied, the logic control module 1120 in the source driver IC 1100 controls the first mode control module 1130 to disable the first recognition mode. In some embodiments, in a case where the source driver IC 1100 enables the first recognition mode for the first line of the data in the initial image frame output by the source driver IC 1100 after the lock signal is switched from the first level to the second level, the logic control module 1120 in the source driver IC 1100 is further configured to control the first mode control module 1130 to disable the first recognition mode after entering a horizontal blanking period of a second line of the data in the first image frame. The first image frame refers to the initial image frame output by the source driver IC 1100 after the lock signal is switched from the first level to the second level.

The horizontal blanking (HBK) period may also be referred to as a line blanking period, which refers to a time interval in which a scanning point returns from a right edge to a left edge of the image frame in a scanning process to prepare for a new line scanning. The horizontal blanking period is used to ensure correct display and synchronization of each line of the data in the image frame. In the embodiments of the present disclosure, the horizontal blanking period of the second line of the data may refer to a time interval for preparing to enter the scanning of the second line of the data after the scanning of the first line of the data is completed, that is, the horizontal blanking period of the second line of the data may be before the scanning of the second line of the data. After entering the horizontal blanking period of the second line of the data in the initial image frame, the source driver IC 1100 disables the first recognition mode, that is, in the embodiments of the present disclosure, the first recognition mode may be enabled only for the first line of the data in the initial image frame output by the source driver IC 1100 after the lock signal is switched from the first level to the second level.

Certainly, in actual application, the target condition may also be set in other manners, and the target condition may be flexibly set with reference to requirements, which is not limited in the embodiments of the present disclosure. For example, in a case where the source driver IC 1100 enables the first recognition mode for the initial image frame output by the source driver IC 1100 after the lock signal is switched from the first level to the second level, the target condition may also be set as entering the second image frame output by the source driver IC 1100, that is, the source driver IC 1100 disables the first recognition mode after entering the second image frame. For another example, the target condition may be set as a target enabling duration, and after an enabling duration of the first recognition mode reaches the target enabling duration, the source driver IC 1100 disables the first recognition mode.

In addition to the first recognition mode, the source driver IC 1100 may also enable a second recognition mode. In some embodiments, as shown in FIG. 1, the source driver IC 1100 further includes a second mode control module 1140. The logic control module 1120 is further configured to control the second mode control module 1140 to enable a second recognition mode after the source driver IC 1100 is powered on. The second recognition mode includes performing a second correctness check on image data of one or more image frames.

In some embodiments, a period of the first correctness check in the first recognition mode is less than a period of the second correctness check in the second recognition mode. For example, the first recognition mode may be a bit mode, the second recognition mode may be a packet mode. In the first recognition mode, the first mode control module 1130 in the source driver IC 1100 performs the first correctness check on the driving information of the image frame with a period of 1UI, and in the second recognition mode, the second mode control module 1140 in the source driver IC 1100 performs the second correctness check on the image data of the image frame with a period of 9UI. 1UI refers to one unit period, and 9UI refers to nine unit periods. Generally, one unit period represents a time period occupied by one bit of data, that is, one period of a clock. For example, the data size is 2G, and 1UI is the reciprocal of 2G. Of course, in practical applications, the period of performing the first correctness check on the driving information in the first recognition mode may also be greater than the period of performing the second correctness check on the image data in the second recognition mode. This is not limited in the embodiments of the present disclosure.

In conclusion, in the embodiments of the present disclosure, when the source driver IC detects that the lock signal is switched from the first level to the second level, for example, switched from a low level to a high level, the first recognition mode is enabled to perform the first correctness check on the driving information of one or more image frames. After the target condition is satisfied, the source driver IC disables the first recognition mode, and no longer performs the first correctness check on the driving information of one or more image frames, until the lock signal is switched from the first level to the second level again. In the embodiments of the present disclosure, the first recognition mode is not in a continuous working state, but is enabled when the level state of the lock signal is switched, and then the first recognition mode is disabled after the target condition is satisfied. In the embodiments of the present disclosure, the dynamic power consumption of the source driver IC can be reduced through the working state control of the first recognition mode, and thus the energy consumption of the display device can be reduced. In addition, the embodiments of the present disclosure can be implemented based on an existing display device, without adding a new component to the display device, and has high compatibility with the existing display device.

Referring to FIG. 4, FIG. 4 is a flowchart of a mode control method according to an embodiment of the present disclosure. The mode control method may be applied to a source driver IC of a display device, such as the source driver IC shown in FIG. 1, and the source driver IC is connected to a timing controller of the display device. As shown in FIG. 4, the mode control method may include the following steps:

Step 410, enabling a first recognition mode to perform a first correctness check on a driving information of one or more image frames when a lock signal output by the source driver IC to the timing controller is switched from a first level to a second level;

Step 420, disabling the first recognition mode after a target condition is satisfied.

In some embodiments, the aforementioned step 410 includes: enabling the first recognition mode for a first image frame when the lock signal is switched from the first level to the second level. The first image frame refers to an initial image frame output by the source driver IC after the lock signal is switched from the first level to the second level.

In some embodiments, the aforementioned step 410 includes: enabling the first recognition mode for a first line of data in the first image frame when the lock signal is switched from the first level to the second level; and the aforementioned step 420 includes: disabling the first recognition mode after entering a horizontal blanking period of a second line of the data in the first image frame.

In some embodiments, the aforementioned mode control method further includes: performing a state detection continuously on the lock signal after the source driver IC is powered on. The state detection includes detecting whether the lock signal is switched from the first level to the second level and detecting whether the lock signal is switched from the second level to the first level.

In some embodiments, the first level is a low level, and the second level is a high level.

In some embodiments, the driving information includes at least one of data start instruction and a polarity indication instruction. The data start instruction is configured to indicate a start display moment of the image frame, and the polarity indication instruction is configured to indicate a driving polarity of the image frame.

In some embodiments, the aforementioned mode control method further includes: enabling a second recognition mode to perform a second correctness check on image data of one or more image frames after the source driver IC is powered on.

In some embodiments, a period of the first correctness check is less than a period of the second correctness check.

In conclusion, in the embodiments of the present disclosure, when the source driver IC detects that the lock signal is switched from the first level to the second level, for example, switched from a low level to a high level, the first recognition mode is enabled to perform the first correctness check on the driving information of one or more image frames. After the target condition is satisfied, the source driver IC disables the first recognition mode, and no longer performs the first correctness check on the driving information of one or more image frames, until the lock signal is switched from the first level to the second level again. In the embodiments of the present disclosure, the first recognition mode is not in a continuous working state, but is enabled when the level state of the lock signal is switched, and then the first recognition mode is disabled after the target condition is satisfied. In the embodiments of the present disclosure, the dynamic power consumption of the source driver IC can be reduced through the working state control of the first recognition mode, and thus the energy consumption of the display device can be reduced. In addition, the embodiments of the present disclosure can be implemented based on an existing display device, without adding a new component to the display device, and has high compatibility with the existing display device.

It should be understood that the aforementioned mode control method is a method embodiment corresponding to the aforementioned source driver IC. For the detailed description of each step and the beneficial effects thereof in the aforementioned mode control method, reference can be made to the embodiments of the aforementioned source driver IC, which will not be repeated herein.

The mode control method provided in the embodiments of the present disclosure is described below by using an example.

Figure 5:
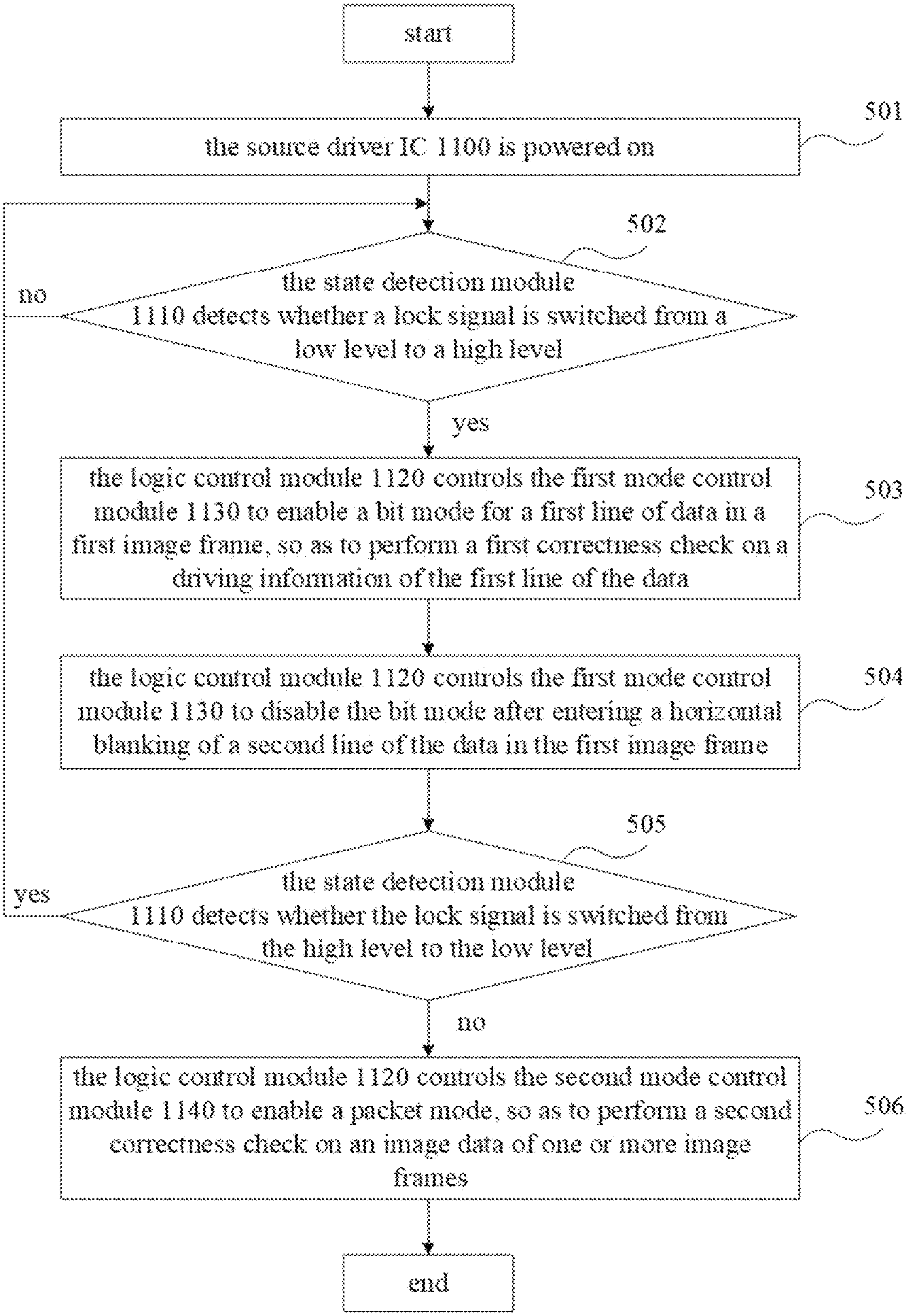
FIG. 5 is a flowchart of another mode control method according to an embodiment of the present disclosure.
Figure 6:
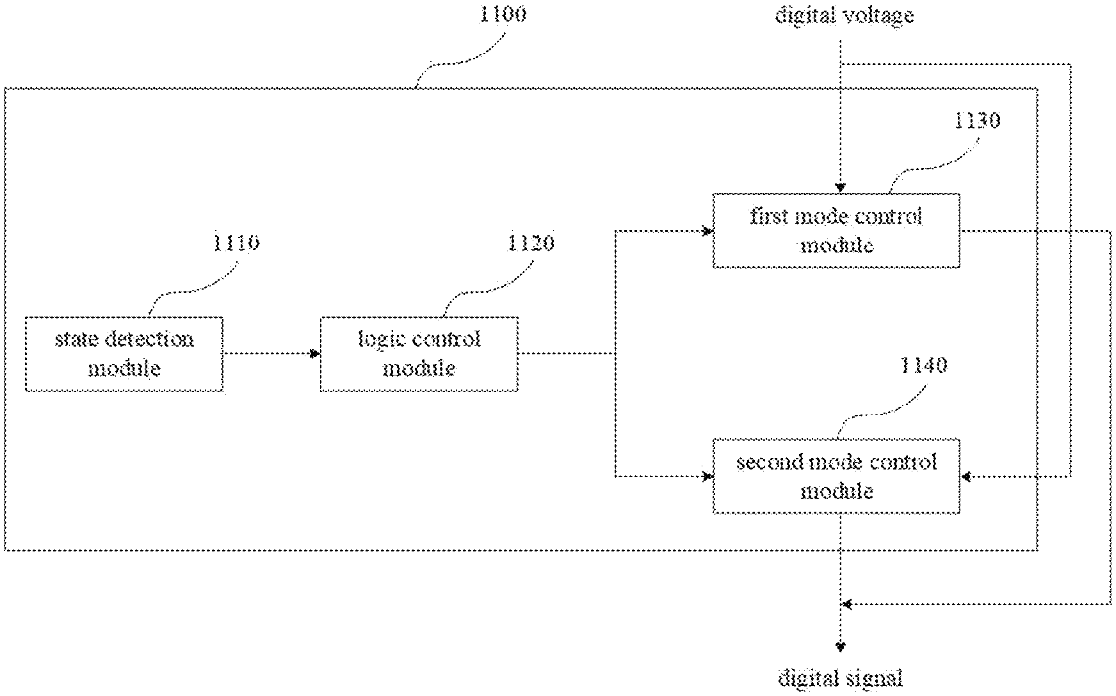
FIG. 6 is a schematic diagram of another source driver IC according to an embodiment of the present disclosure.

Referring to FIG. 5, FIG. 5 is a flowchart of another mode control method according to an embodiment of the present disclosure. The mode control method may be applied to a source driver IC 1100 shown in FIG. 1 or FIG. 6. The source driver IC 1100 is connected to a timing controller of a display device, and the source driver IC 1100 includes a state detection module 1110, a logic control module 1120, a first mode control module 1130 and a second mode control module 1140. As shown in FIG. 6, a digital voltage DVDD is input to the first mode control module 1130 and the second mode control module 1140 in the source driver IC 1100, and a digital signal is output by the first mode control module 1130 and the second mode control module 1140. As shown in FIG. 5, the mode control method may include the following steps 501 to 508.

Step 501, the source driver IC 1100 is powered on.

Step 502, the state detection module 1110 detects whether a lock signal is switched from a low level to a high level. If yes, go to step 503; otherwise, continue with step 502.

Step 503, the logic control module 1120 controls the first mode control module 1130 to enable a bit mode for a first line of data in a first image frame, so as to perform a first correctness check on a driving information of the first line of the data. The first image frame refers to an initial image frame output by the source driver IC 1100 after the lock signal is switched from the low level to the high level, and the driving information includes a CS instruction and a CMD instruction. The bit mode may refer to the aforementioned first recognition mode. In the bit mode, the first mode control module 1130 in the source driver IC 1100 performs the first correctness check on the driving information with a period of 1UI.

Step 504, the logic control module 1120 controls the first mode control module 1130 to disable the bit mode after entering a horizontal blanking of a second line of the data in the first image frame.

Step 505, the state detection module 1110 detects whether the lock signal is switched from the high level to the low level. If yes, go to step 502; otherwise, continue with step 506. Step 505 may be performed simultaneously with step 503, or may be performed after step 504, which is not limited in the embodiment of the present disclosure.

Step 506, the logic control module 1120 controls the second mode control module 1140 to enable a packet mode, so as to perform a second correctness check on image data of one or more image frames. Step 506 may be performed after step 502, or may be performed after step 503, which is not limited in the embodiment of the present disclosure. The packet mode may be the aforementioned second recognition mode. In the packet mode, the second mode control module 1140 in the source driver IC 1100 performs the second correctness check on the image data with a period of 9UI.

Figure 7:
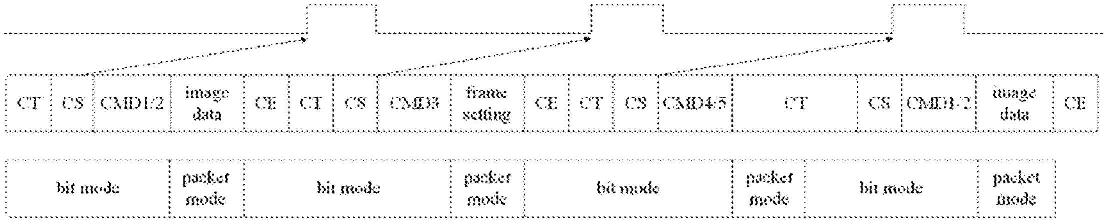
FIG. 7 is a schematic diagram of a mode control method.
Figure 8:
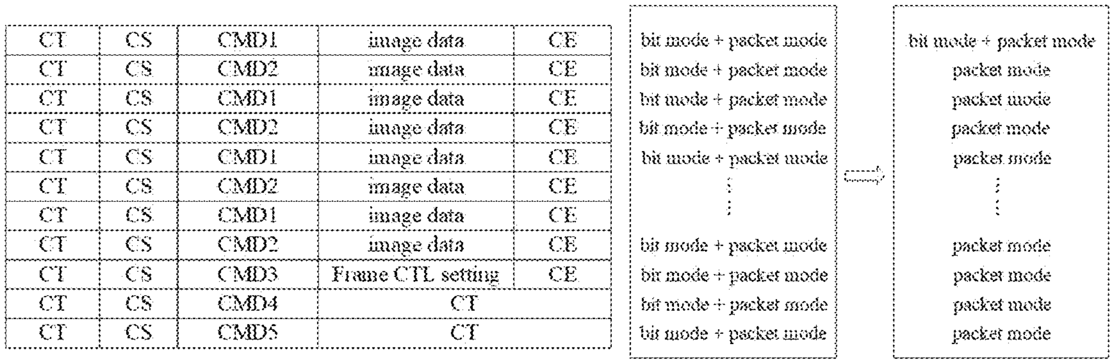
FIG. 8 is a schematic diagram of a mode control method according to an embodiment of the present disclosure.

As shown in FIG. 7, in a related art, the bit mode and the packet mode are enabled for each line of the data in an image frame. As shown in FIG. 8, in the embodiment of the present disclosure, when the lock signal is switched from the low level to the high level, the bit mode and the packet mode are enabled for the first line of the data in the initial image frame output by the source driver IC 1100 after the lock signal is switched from the low level to the high level, and only the packet mode is enabled, with the bit mode being disabled, for other lines of the data in the initial image frame and for other image frames.

Figure 9:
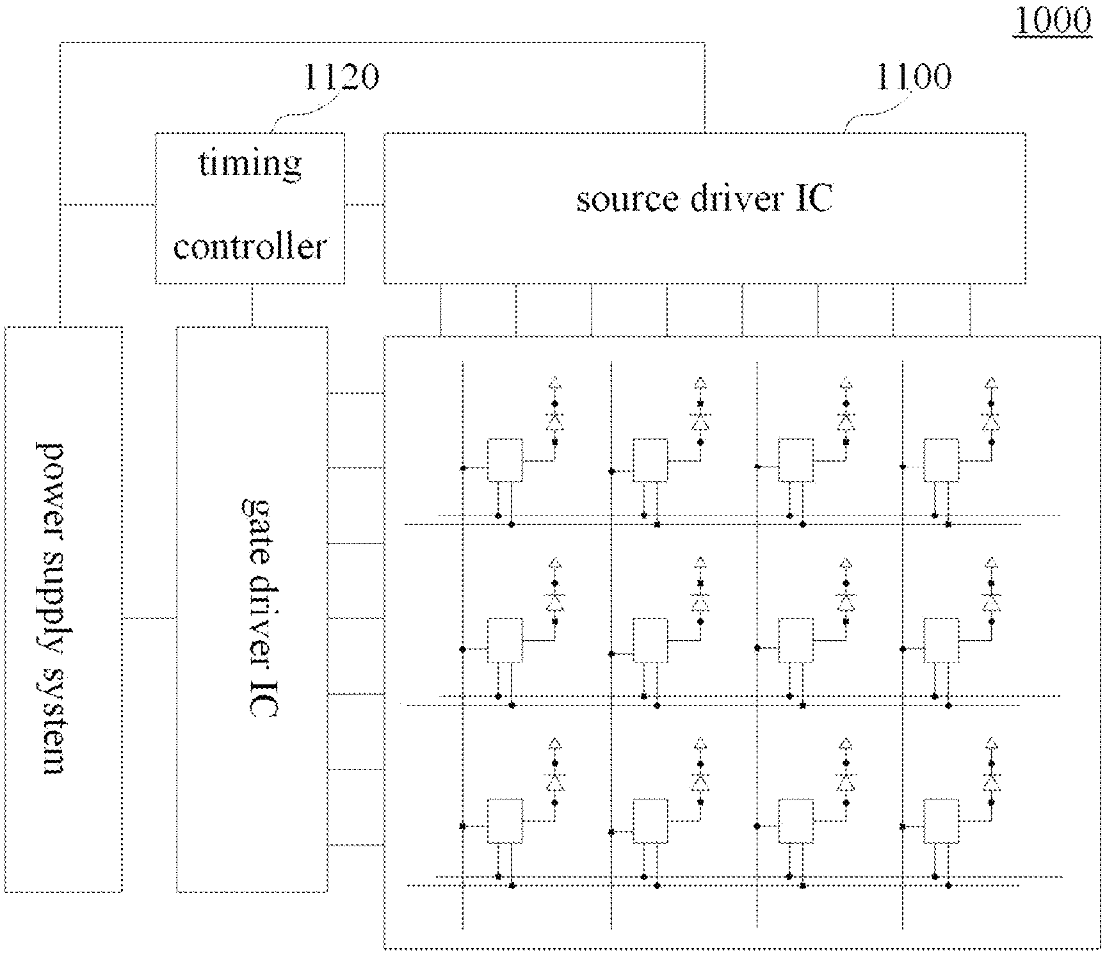
FIG. 9 is a schematic diagram of a display device according to an embodiment of the present disclosure.

Referring to FIG. 9, FIG. 9 is a schematic diagram of a display device according to an embodiment of the present disclosure. As shown in FIG. 9, the display device 1000 includes one or more source driver ICs 1100 and a timing controller 1200, and the source driver IC 1100 is connected to the timing controller 1200. Generally, one display device may be driven by multiple source driver ICs 1100, and a number of the source driver ICs 1100 in the display device is not limited in the embodiments of the present disclosure. For ease of description in FIG. 9, one source driver IC 1100 is used as an example. For steps performed by the source driver IC 1100, modules included in the source driver IC 1100, and beneficial effects that can be achieved by the source driver IC 1100, please refer to the aforementioned embodiments, and details are not described herein again.

In some embodiments, the logic control module is further configured to control the first mode control module to enable the first recognition mode for a first image frame when the lock signal is switched from the first level to the second level. The first image frame refers to an initial image frame output by the source driver IC after the lock signal is switched from the first level to the second level.

In some embodiments, the logic control module is further configured to: control the first mode control module to enable the first recognition mode for a first line of data in the first image frame when the lock signal is switched from the first level to the second level; and control the first mode control module to disable the first recognition mode after entering a horizontal blanking period of a second line of the data in the first image frame.

In some embodiments, the state detection module is further configured to continuously perform a state detection on the lock signal after the source driver IC is powered on.

The state detection includes detecting whether the lock signal is switched from the first level to the second level and detecting whether the lock signal is switched from the second level to the first level.

In some embodiments, the first level is a low level, and the second level is a high level.

In some embodiments, the driving information includes at least one of a data start instruction and a polarity indication instruction; the data start instruction is configured to indicate a start display moment of the image frame, and the polarity indication instruction is configured to indicate a driving polarity of the image frame.

In some embodiments, the source driver IC further includes a second mode control module; and the logic control module is further configured to control the second mode control module to enable a second recognition mode to perform a second correctness check on image data of one or more image frames after the source driver IC is powered on.

In some embodiments, a period of the first correctness check is less than a period of the second correctness check.

In the aforementioned embodiments, the description of each embodiment focuses on different perspectives. For contents not described in details in a certain embodiment, reference can be made to the related description in other embodiments.

The present disclosure has been described in detail with reference to a source driver IC, a mode control method and a display device provided in the embodiments of the present disclosure. Specific examples are used herein to illustrate the principles and embodiments of the present disclosure. The description of the above embodiments is merely intended to help understand the technical solutions and the core idea of the present disclosure. At the same time, those skilled in the art may make modifications to the specific implementation modes and applying ranges based on concepts disclosed herein. In summary, the content of the description should not be construed as limiting the scope of the present disclosure.

What is claimed is:

1. A mode control method, applied to a source driver IC connected to a timing controller, wherein the mode control method comprises:

detecting whether a lock signal output by the source driver IC to the timing controller is switched from a first level to a second level;

enabling a first recognition mode to perform a first correctness check on a driving information of one or more image frames when the lock signal is switched from the first level to the second level; and disabling the first recognition mode after a target condition is satisfied, wherein the enabling of the first recognition mode to perform the first correctness check on the driving information of the one or more image frames when the lock signal is switched from the first level to the second level comprises:

enabling the first recognition mode for a first image frame when the lock signal is switched from the first level to the second level; wherein the first image frame refers to an initial image frame output by the source driver IC after the lock signal is switched from the first level to the second level wherein the enabling of the first recognition mode for the first image frame when the lock signal is switched from the first level to the second level comprises:

enabling the first recognition mode for a first line of data in the first image frame when the lock signal is switched from the first level to the second level; and wherein the disabling of the first recognition mode after the target condition is satisfied comprises: disabling the first recognition mode after entering a horizontal blanking period of a second line of the data in the first image frame.

2. The mode control method according to claim 1, further comprising:

continuously performing a state detection on the lock signal after the source driver IC is powered on; wherein the state detection comprises detecting whether the lock signal is switched from the first level to the second level and detecting whether the lock signal is switched from the second level to the first level.

3. The mode control method according to claim 1, wherein the first level is a low level, and the second level is a high level.

4. The mode control method according to claim 1, wherein the driving information comprises at least one of a data start instruction and a polarity indication instruction; the data start instruction is configured to indicate a start display moment of the image frame, and the polarity indication instruction is configured to indicate a driving polarity of the image frame.

5. The mode control method according to claim 1, further comprising:

enabling a second recognition mode to perform a second correctness check on image data of one or more image frames after the source driver IC is powered on.

6. The mode control method according to claim 5, wherein a period of the first correctness check is less than a period of the second correctness check.

7. A mode control method, applied to a source driver IC of a display device, and the source driver IC being connected to a timing controller of the display device; wherein the mode control method comprises:

enabling a first recognition mode to perform a first correctness check on a driving information of one or more image frames when a lock signal output by the source driver IC to the timing controller is switched from a first level to a second level; and disabling the first recognition mode after a target condition is satisfied, wherein the mode control method further comprises:

enabling a second recognition mode to perform a second correctness check on image data of one or more image frames after the source driver IC is powered on, and wherein a period of the first correctness check is less than a period of the second correctness check.

8. The mode control method according to claim 7, wherein the enabling of the first recognition mode to perform the first correctness check on the driving information of the one or more image frames when the lock signal output by the source driver IC to the timing controller is switched from the first level to the second level comprises:

enabling the first recognition mode for a first image frame when the lock signal is switched from the first level to the second level; wherein the first image frame refers to an initial image frame output by the source driver IC after the lock signal is switched from the first level to the second level.

9. The mode control method according to claim 8, wherein the enabling of the first recognition mode for the first image frame when the lock signal is switched from the first level to the second level comprises:

enabling the first recognition mode for a first line of data in the first image frame when the lock signal is switched from the first level to the second level;

wherein the disabling of the first recognition mode after the target condition is satisfied comprises:

disabling the first recognition mode after entering a horizontal blanking period of a second line of the data in the first image frame.

10. The mode control method according to claim 7, wherein the mode control method further comprises:

performing a state detection continuously on the lock signal after the source driver IC is powered on; wherein the state detection comprises detecting whether the lock signal is switched from the first level to the second level and detecting whether the lock signal is switched from the second level to the first level.

11. The mode control method according to claim 7, wherein the first level is a low level, and the second level is a high level.

12. A display device, comprising a driver IC and a timing controller, and the source driver IC being connected to the timing controller; wherein the display device comprises a processor for executing a mode control method, and the mode control method comprises:

detecting whether a lock signal output by the source driver IC to the timing controller is switched from a first level to a second level;

enabling a first recognition mode to perform a first correctness check on a driving information of one or more image frames when the lock signal is switched from the first level to the second level; and disabling the first recognition mode after a target condition is satisfied, wherein the enabling of the first recognition mode to perform the first correctness check on the driving information of the one or more image frames when the lock signal is switched from the first level to the second level comprises:

enabling the first recognition mode for a first image frame when the lock signal is switched from the first level to the second level; wherein the first image frame refers to an initial image frame output by the source driver IC after the lock signal is switched from the first level to the second level, wherein the enabling of the first recognition mode for the first image frame when the lock signal is switched from the first level to the second level comprises:

enabling the first recognition mode for a first line of data in the first image frame when the lock signal is switched from the first level to the second level; and wherein the disabling of the first recognition mode after the target condition is satisfied comprises: disabling the first recognition mode after entering a horizontal blanking period of a second line of the data in the first image frame.

13. The display device according to claim 12, wherein the the mode control method further comprises:

enabling a second recognition mode to perform a second correctness check on image data of one or more image frames after the source driver IC is powered on.

14. The display device according to claim 13, wherein a period of the first correctness check is less than a period of the second correctness check.

* * * * *